April 14, 1936.                O. O. RIESER                2,037,269
                             MOLDING PROCESS
                    Filed April 30, 1931       2 Sheets-Sheet 1

INVENTOR.
Oliver O. Rieser
by Allen + Allen
ATTORNEYS

April 14, 1936.   O. O. RIESER   2,037,269
MOLDING PROCESS
Filed April 30, 1931   2 Sheets-Sheet 2
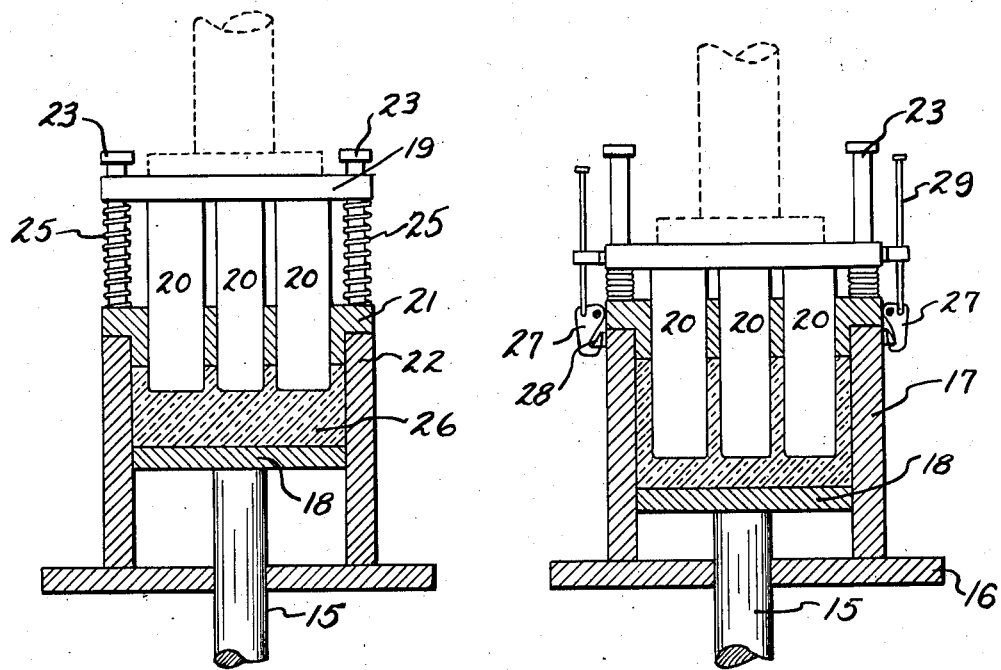
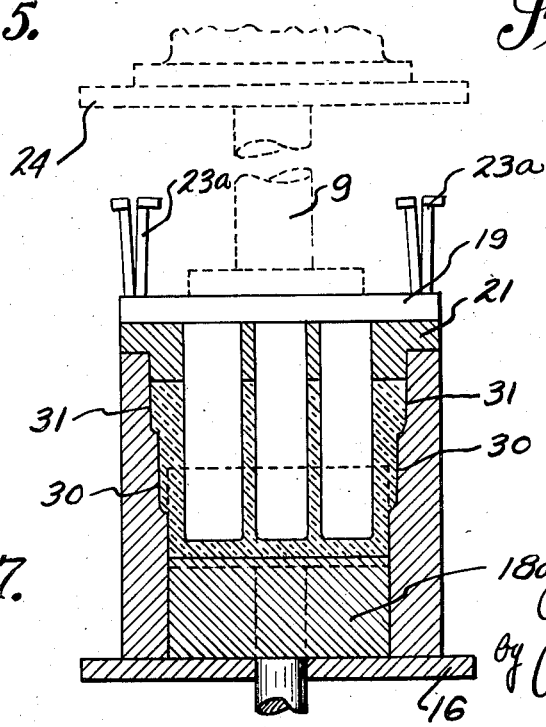
INVENTOR.
Oliver O. Rieser
by Allen & Allen
ATTORNEYS Patented Apr. 14, 1936

2,037,269

UNITED STATES PATENT OFFICE 2,037,269

MOLDING PROCESS

Oliver O. Rieser, Oak Park, Ill., assignor to The Richardson Company, Lockland, Ohio, a corporation of Ohio Application April 30, 1931, Serial No. 534,008

4 Claims. (Cl. 18—55)

My invention relates to a molding process whereby more perfect molded articles are formed, particularly in long draw molding operations. The more specific objects of my invention will be apparent from the following explanation or will be pointed out hereinafter; and for the sake of clearness, reference is now made to the drawings which accompany and form a part of this application in which—

Figure 5 is a semi-diagrammatic sectional view of a mold in which my molding process is being practiced, the figure illustrating the initial step in the molding process.

Figure 6 illustrates an intermediate condition in the molding process.

Figure 7 illustrates the condition of the mold at the end of the molding step.

I shall describe my invention in connection with the manufacture of storage battery cases as exemplary of articles to which my invention is particularly adaptable. It will be understood that my invention is not restricted thereto. Storage battery cases are formed by molding under relatively high pressure a stiff, dense, plastic composition of bitumen, mineral filler and fibers. In ordinary practice a mold is provided comprising a female portion, and a male portion having the plungers necessary to the formation of the cell spaces. I refer to battery boxes comprising a bottom and outer walls and inner cell defining partitions, all molded out of plastic composition into an integral or monolithic structure.

Peculiar problems are presented in the molding of such articles and other articles which necessitate what is known as a long draw molding operation. The outer walls and partitions of a storage battery box are relatively thin and they may extend six or seven inches or more above the bottom. Since the box is formed by pressure-molding from a lump of plastic material, these walls must be formed by a flowing or extrusion of the plastic composition between the mold parts, that is to say between the plungers and the female mold walls, and in the inner spaces between adjacent plungers.

Figure 1:
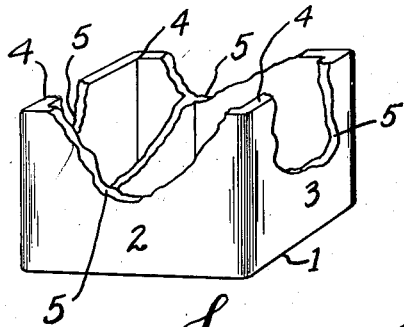
Figure 1 is a perspective view of an incompletely molded battery box in which is illustrated the manner of initial formation or flow of the plastic.

In such molds, either due to differences in the plasticity of different parts of the composition introduced, or due to the fact that larger mold spaces interpose less resistance to the flow of the plastic, or both, the plastic does not tend to flow evenly, and in most instances a partly completed article will appear as shown in Figure 1 where the bottom is indicated by 1, a side wall by 2 and an end wall by 3. It will be noticed that in portions of this article such as at 4, the composition has risen until the tops of the walls are finished; but there are large interspaces 5 where the composition has not filled the mold cavity. The flow of the composition in the article of Figure 1 has been for the most part an extrusion flow in the direction of the arrows.

Figure 2:
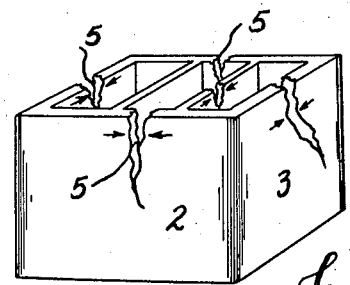
Figure 2 is an illustration of a battery box in a more complete but still unfinished state of formation.

When further pressure is applied to the article of Figure 1 in the mold, the interspaces 5 begin to fill up partly by a continuation of the vertical extrusion, but also partly by a side flow of the materials as indicated by the arrows in Figure 2. Finally, at the completion of the walls, the interspaces 5 will disappear; but they will be closed by a mere pressing together of adjacent masses of the composition. Such a pressing together, even under high pressure, does not always form a perfectly knit wall, for the reason that the composition is not likely to be perfectly united. It is pressed together and may be cemented together by the binder in the composition; but the fibers do not completely interlace across these fissures as will be obvious; and the defects caused thereby are likely to show up as hair cracks in the finished article, sometimes visible to the eye and sometimes as invisible weaknesses. In exaggerated instances the electrolyte in a storage battery case may even leak through these hair cracks. For reasons which will be obvious from the foregoing, the hair cracks and other imperfections occur substantially entirely at the top of the walls of the article. The flow of the plastic composition in the molding process is for the most part an extrusion or sliding action accompanied, in instances where the mold walls are formed with progressive recessions, by some intermixing. The sliding action of the composition appears to harden it somewhat and appears also to make it less likely to knit together perfectly when the composition flows to close the interspaces 5.

It is an object of my invention to provide a way of molding storage battery cases or like articles without at any time producing therein anything comparable to the interspaces 5. It is another object of my invention to provide a way of molding long draw articles in which the flow of the plastic composition is substantially entirely unidirectional and in which there is no appreciable lateral flow of the plastic transverse to the direction of molding.

Before describing the procedure by which I attain these objects, I shall now describe a molding apparatus suitable for the carrying on of my process, it being understood that this apparatus is exemplary only, and that my invention is capable of being carried on in other forms of apparatus.

Figures 3, 4:
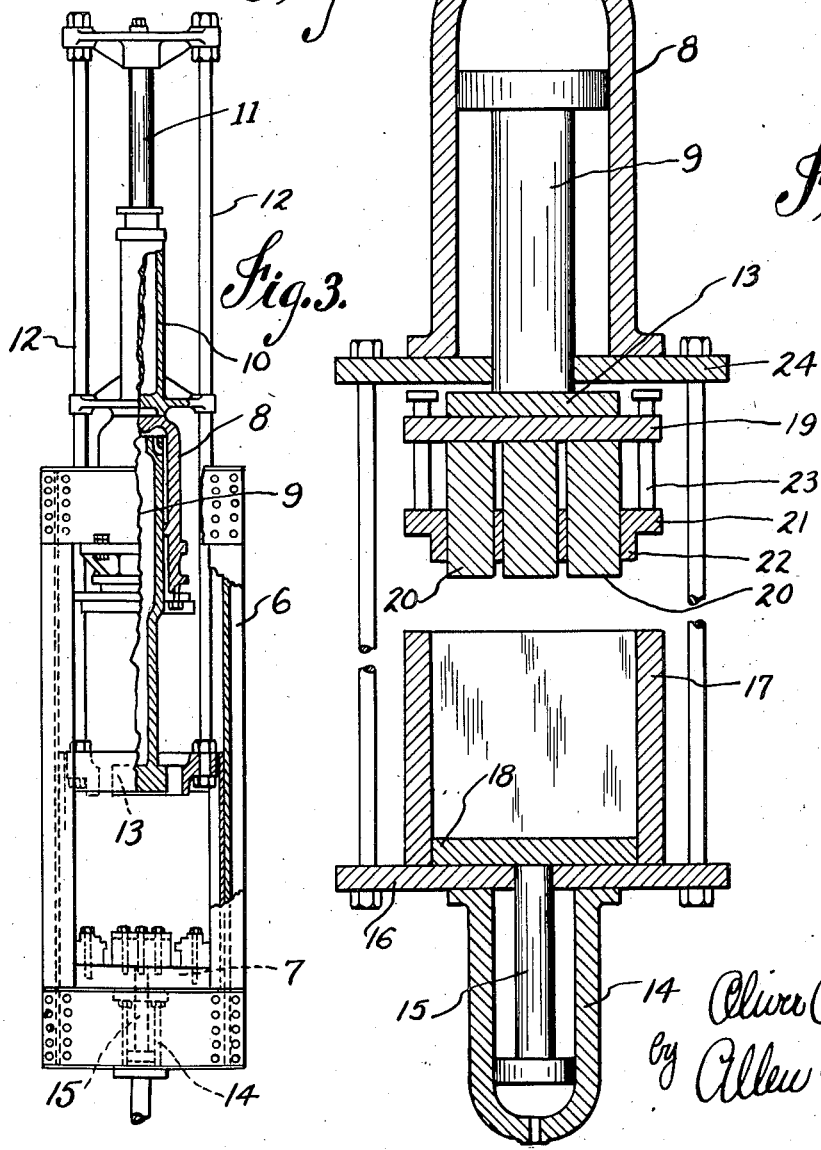
Figure 3 shows in elevation and partly in section a press suitable for use in the practice of my invention.
Figure 4 is a semi-diagrammatic view of a press and mold assembly, many of the details being omitted for the sake of clearness, and particularly mechanism designed for the retraction of the main plunger.

In Figure 3 I have shown an exemplary form of press which has been commercially used in the manufacture of storage battery cases. It has a frame indicated generally at 6 and a bed 7 upon which a mold block may be fastened. A main cylinder 8 is provided having a ram 9, to which the male assembly of the mold may be attached. A supplementary withdrawal cylinder 10 is provided having a plunger 11 attached by means of rods 12 to the head 13 so that this head may be retracted. A cylinder 14 is provided below the bed. It has a plunger 15 acting upon the bottom plate of the mold as I shall presently describe.

This arrangement is illustrated somewhat diagrammatically in Figure 4 in which 8 again indicates the main cylinder and 9 the ram attached to the head 13. The kick out cylinder 14, located below the press bed 16 has the ram 15 operating as shown through the press bed. I have shown a mold comprising a female part or hollow block 17, provided with a bottom plate 18 slidable with respect to the remainder of the mold, and acted upon as shown by the plunger 15 of the kick out cylinder. The mold block 17 will be understood as fastened upon the press bed 16 in suitable alignment.

The male portion of the mold is attached to the ram head 13, and comprises a plate 19 to which the plungers 20 are attached. A stripper plate 21 is provided having an extension 22 adapted to enter the top part of the female mold and to center the plungers 20 therein. The stripper plate 21 is slidable with reference to the plungers and is guided upon the plate 19 by pins 23. It will be observed that when the male assembly is fully withdrawn, these pins may strike against a suitable abutment, say the head portion 24 of the press, so as to cause the stripper plate to slide with reference to the plungers and to strip therefrom a completed battery box which has been carried out of the female part of the mold upon the plungers. The press and mold as hereinabove described, is not novel with me per se, the specific improvements in mechanism which I have made being set forth hereinafter.

The ordinary molding operation with mechanism of the type illustrated in Figure 4 begins with the parts in the relationship shown. A quantity of plastic material is introduced into the female part of the mold and the male part is brought down. The projection 22 of the stripper plate seats itself in the top of the mold block 17, and the plungers then slide through the stripper plate so as to complete the molding operation. When the molding operation is finished, the parts are in the relationship shown in Figure 7.

In this procedure the plastic composition is first caused to fill the bottom of the mold and then to flow upwardly as hereinabove described, its upward travel not being controlled.

Instead of this procedure, I mold in such a way that the flow of the plastic is at all times controlled, and there is no substantial lateral flow in my plastic so as to form knit lines or hair cracks extending inwardly from the upper edges of the walls of the finished article. In a representative form of my procedure, I block the stripper plate 21 away from the plate 19 by any suitable means. I then introduce a weighed quantity of the plastic material into my mold and bring down the male head so that the stripper plate extension 22 is caused to enter the mold as shown in Figure 5 and is held there by the blocking means referred to. Next I actuate the kick-out ram 15 so as to raise the bottom plate 18 of my mold and compress the plastic composition 26 against the lower edge of the stripper plate and against the plungers 20. Since in a mold of this type the lower edges of the stripper plate extension 22 mold the upper edges of the finished article, it will be seen that one of the first steps in my molding operation is the formation by molding of the upper edges of my box as shown in Figure 5. This is accomplished without a lateral flow of the composition and of course, without the formation of flaws or knit lines. Next the plungers 20 are brought down under pressure by the action of the ram 9, the stripper plate being held against the top of the mold during the operation. I preferably leave some pressure upon the kick out ram 15. Ordinarily the kick out cylinder 14 is much less in diameter than the main cylinder 8, and the difference in pressure exerted thereby is advantageous in my molding operation.

Figure 6 shows the molding operation in an intermediate stage. There it will be seen that, as the plungers 20 are forced by pressure into the plastic composition and into the mold block 17, the bottom plate of the mold is caused to sink; but that it at all times serves to keep the plastic composition filling the entire interior spaces of the mold.

At the end of the molding operation as illustrated in Figure 7, the bottom plate 18 will be resting upon the bed 16 of the press or some other suitable support. The plate 19 will be resting tightly against the stripper plate 21. At this point the cylinder 14 may be exhausted if desired so that the full pressure of which the press is capable may be exerted upon the mold parts.

With reference to locking means to hold the stripper plate down upon the mold top during the molding operation, it will be possible to use blocks of wood or the like engaging between the stripper plate and the male head. This however, would involve changing blocks as the molding progressed, and would greatly slow up the procedure. The advantage of automatic or self-acting means to this end will be obvious, and several such means may be employed. In Figure 5 I have shown coiled springs 25 surrounding the pins 23 upon which the stripper plate guides, said springs engaging between the striper plate 21 and the head 19. The compressive strength of these springs should be such that during the initial molding stages, the stripper plate will be held down upon the top of the mold against the back pressure of the material in the mold. It will be understood that during the period in which the mold parts come into engagement, i. e., the period in which the material is being formed into shape, the pressure is relatively less thereon than in the later stages of the molding. In other words, the heavy pressure is exerted upon the composition after the mold parts are in interengagement and after the male head 19 is down solidly upon the stripper plate 21. Thus it is possible to use springs or other devices of such strength as will permit the retaining of the stripper plate while not substantially relieving the useful pressure upon the plastic material. It will be found preferable to recess the stripper plate and head so as to accommodate the coiled springs in compressed position, whereby the male head may be brought down tight against the stripper plate.

A disadvantage of coiled springs or similar devices exerting a continuous downward pressure upon the stripper plate is that they tend to strip the article from the stripper plate and cause it to remain in the mold unless pushed out by the plunger 15. Consequently it is in some instances preferable to provide means for eliminating continuously acting compression members and for locking the stripper plate to the mold. In Figure 6, I have shown latching means 27 pivoted to the stripper plate and engaging over abutments 28 on the female mold part. These latching means may be moved by rods 29 or other devices. They may be used with coiled springs as shown in Figure 6 or without them, since in the initial stages of the molding operation, it is not difficult to bring the stripper plate down tight upon the top of the mold. If any difficulty is experienced, the stripper can initially be blocked away from the male head and the blocks then removed. In any event the latches 27 may be made automatic in character, if desired. When no compression means are employed between the male head and the stripper plate, the usual practice will be to release the latches at the end of the press dwell before withdrawing the ram, so that the box may ride out of the press upon the male plungers.

A very simple expedient but one which I prefer is illustrated in Figure 7 where the pins 23a, corresponding to the pins 23 in the other figures, are shown in split form, the divided parts thereof tending to separate one from the other by the inherent resilience of the metal. It will be obvious that such pins riding through holes in the male head 19 will bind therein frictionally and this frictional resistance may be so proportioned that the stripper plate will be held down against the top of the mold throughout the molding operation. As the ram 9 is withdrawn upwardly, this frictional resistance will hold the stripper plate 21 against the head 19 until a position is reached where the tops of the pins 23a strike the press head 24. At this point the pins will be pushed against their own resistance through the holes in the male head 19 and the box stripped from the plunger. The ram 9 is retracted until the male head 19 lies against the top of the pins 23a and is therefore separated by as great a distance as possible from the stripper plate. Conversely upon the next molding operation, the stripper plate is brought down tightly against the top of the mold and held there by the frictional resistance of the pins 23a in the holes in the head 19 throughout the molding operation.

Split pins, as shown in Figure 7, have been found to be particularly valuable in curing a defect of the ordinary molding operation, whether or not my process as outlined herein is followed. Under conditions where there is comparatively no frictional resistance between the pins and the male head, it sometimes happens that the box rides out of the mold upon the male plungers, the stripper plate remaining in close contact with the male head. Suddenly however, the engagement of the box and the male plungers is released by a jar or otherwise, the box falls from the male plungers and the stripper plate comes down under its own weight very rapidly. If this happens to occur at a time when an operator is reaching for the completely molded box, an accident may occur to the operator's hand. Depending somewhat upon the height of the male head at the time the said engagement was broken, it is possible for the stripper plate to fall down against the top of the female mold, seriously cutting or crushing the operator's hand if it be in the way, since the weight of the stripper plate and pins is relatively large. However, when the pins are split as indicated herein, this cannot occur because the stripper plate is held by the frictional resistance of the pins against the male head, until these pins strike the press head as explained.

In instances where the mold is characterized by a plurality of recessions such as are illustrated at 30 and 31 in Figure 7, it is necessary to provide a bottom plate 18a of sufficient depth so that when it is in its upper position as is shown in the dotted lines in said Figure 7, it will extend downwardly far enough to contact and close the smallest internal dimension of the mold. In such a mold, of course, the walls of the female portion will be deeper by a distance sufficient to accommodate said thicker base plate 18a.

It will be clear that my invention is not restricted to use with molds or press mechanism of the exact form shown, and that it may be used in any type of mold provided with means for keeping the interior volume of the mold substantially constant during the entire molding operation, and with press mechanism of any suitable form.

Having thus described my invention, what I claim as new and desire to secure by Letters Patent, is:—

1. The process of molding an article which comprises confining a mass of plastic material laterally and at its opposite ends, and forcing a core element into one end of the mass, and allowing the opposite end of the mass to extend at a rate of movement having a definitely controlled ratio to that of the core into the mass while still confining the mass.

2. The process of molding an article which comprises confining a mass of plastic material laterally and at its opposite ends, and forcing a core element into one end of the mass, and allowing the opposite end of the mass to extend, at a rate of movement having a definitely controlled ratio to that of the core into the mass while still confining the mass, and then withdrawing the molded mass, along with the core, from confinement, and then pushing the molded mass off the core.

3. The process of molding an article which comprises deforming a mass of stiff but fluid plastic material under steady power-applied pressure in a mold while keeping the interior volume of the mold cavity constant accompanied by a continuous progression of the deformation during the molding operation, so that the mass of plastic material completely fills said mold cavity at all times, without any recession of any particles of said material from each other at any time during said operation, whereby all surfaces of the material contacted by the mold interior surfaces are maintained continuous throughout the operation, to avoid cracks or shuts in the finished molded article.

4. The process of molding a walled box, which comprises deforming a mass of stiff but fluid plastic material by first forming the edges of the walls of the box in situ and then successively to said forming of the edges and in direct continuation of said forming, forming the interior surfaces of the box under steady power-applied pressure while keeping the interior volume of the mold cavity constant without any recession of any of the particles of said material from each other at any time during said operation, whereby the surfaces of said edges as well as the structure of the walls extending inwardly from said edges are maintained continuous throughout the operation, to avoid cracks or shuts at and extending inwardly along the walls from said edges.

OLIVER O. RIESER.